(12) United States Patent
Ogburn et al.

(10) Patent No.: US 7,619,728 B2
(45) Date of Patent: Nov. 17, 2009

(54) METHODS AND SYSTEMS FOR IN-SITU MACHINERY INSPECTION

(75) Inventors: Erik Matthew Ogburn, Minden, NV (US); George Martin Gilchrist, III, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/828,922

(22) Filed: Jul. 26, 2007

(65) Prior Publication Data

US 2009/0027665 A1 Jan. 29, 2009

(51) Int. Cl.
*G01N 21/00* (2006.01)
*H01L 27/00* (2006.01)

(52) U.S. Cl. .............. 356/237.1; 356/237.2; 250/208.1; 250/214 VT; 250/370.11

(58) Field of Classification Search ... 356/237.1–237.3, 356/426–428, 342–343; 250/214 VT, 214.1, 250/208.1, 370.11
See application file for complete search history.

(56) References Cited

U.S. PATENT DOCUMENTS

| | | | |
|---|---|---|---|
| 4,180,329 A | 12/1979 | Hildebrand | |
| 4,326,804 A | 4/1982 | Mossey | |
| 4,447,123 A * | 5/1984 | Page et al. | 385/115 |
| 4,572,663 A | 2/1986 | Greene et al. | |
| 4,688,891 A * | 8/1987 | Carratt et al. | 385/115 |
| 4,711,524 A | 12/1987 | Morey et al. | |
| 5,095,252 A | 3/1992 | Kurth | |
| 5,177,779 A * | 1/1993 | Cornu et al. | 378/206 |
| 5,308,986 A * | 5/1994 | Walker | 250/370.11 |
| 5,418,608 A * | 5/1995 | Caimi et al. | 356/3.01 |
| 5,733,246 A | 3/1998 | Forkey | |
| 5,815,264 A * | 9/1998 | Reed et al. | 356/336 |
| 5,986,752 A * | 11/1999 | Morito et al. | 356/241.5 |
| 6,448,545 B1 * | 9/2002 | Chen | 250/214 VT |
| 6,796,709 B2 | 9/2004 | Choi | |
| 6,992,315 B2 | 1/2006 | Twerdochlib | |
| 2006/0038988 A1 | 2/2006 | Thermos | |
| 2006/0078193 A1 | 4/2006 | Brummel et al. | |
| 2006/0088793 A1 | 4/2006 | Brummel et al. | |

OTHER PUBLICATIONS

A European Search Report, dated Nov. 3, 2008, for corresponding European patent application No. EP 08-16-0935.

* cited by examiner

*Primary Examiner*—Sang Nguyen
(74) *Attorney, Agent, or Firm*—Armstrong Teasdale LLP

(57) ABSTRACT

Methods and systems for inspecting rotatable machine components are provided. The system includes a fiber optic port configured to extend through a first aperture of a machine casing wherein the port includes an interior end and an exterior end. The system further includes an imager configured to optically couple to the exterior end. The imager includes a light intensifier capable of generate images of inspection components though the port using ambient light. The imager further includes an image capture gate configured to control an acquisition time of the generated images.

9 Claims, 3 Drawing Sheets

METHODS AND SYSTEMS FOR IN-SITU MACHINERY INSPECTION

BACKGROUND OF THE INVENTION

This invention relates generally to inspection of rotating machinery components, and more particularly, to methods and systems for optical inspection of rotating machinery components.

At least some known large machines achieve an optimal efficiency of operation when the machine is maintained operating on-line. For example, gas and steam turbines for electrical power generation are very expensive and are often not removed from service for inspection or maintenance unless absolutely necessary. However, components within the machine typically can only be inspected while the machine is offline and in some cases at least partially disassembled. Known conventional methods of inspecting for example, turbine blades such as surface inspection methods (i.e., magnetic particle testing; eddy current testing; dye penetrant techniques) and volumetric methods (i.e., ultrasonic testing) rely on the periodic disassembly of the turbine. Disassembling a turbine to inspect it is an expensive process and takes the turbine out of service for a significant amount of time.

Because none of the foregoing techniques are suitable for inspection while the turbine is on-line and running under load, other turbine inspection techniques are used in an attempt to monitor machine components during full load operation. For example, vibration analysis, acoustic emissions (AE), passive proximity probes, and ultrasound or eddy current techniques have been employed. Each of these inspection methods has its own unique set of disadvantages. The interior environment of a turbine is hostile for electrical sensing equipment. For example, a gas turbine typically operates at an internal temperature of about 1200 degrees Celsius (2192 degrees Fahrenheit) and a steam turbine may have temperatures of approximately 550 degrees Celsius (1022 degrees Fahrenheit). High pressures and reactive chemistry within turbines provide further detriment to inspection and measurement equipment.

Reliable and early detection of wear and/or failures of the components would permit advantageous scheduling of an outage for repair. Additionally, knowledge of the condition of such components may permit an engineering evaluation that extends the time between outages further facilitates improving the efficiency of the machine.

BRIEF DESCRIPTION OF THE INVENTION

In one embodiment, a system for inspecting rotatable machine components includes a fiber optic port configured to extend through a first aperture of a machine casing wherein the port includes an interior end and an exterior end. The system further includes an imager configured to optically couple to the exterior end. The imager includes a light intensifier capable of generate images of inspection components though the port using ambient light. The imager further includes an image capture gate configured to control an acquisition time of the generated images.

In another embodiment, a method of inspecting internal components of a rotatable machine during operation includes optically accessing an interior of the rotatable machine during normal machine operation and capturing an image of at least one internal component during normal machine operation for a selectable gated time period through the optical access.

In yet another embodiment, a rotatable machine includes a rotatable member, a stationary casing substantially surrounding the rotatable member, and an optical port extending through the casing wherein the port includes a first exterior end configured to be coupled to a gated intensifier imager, a second interior end including a lens for focusing light received from inside the casing, and a fiber optic light pipe extending therebetween configured to transmit the light received to the imager.

DETAILED DESCRIPTION OF THE INVENTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, a process of inspecting internal components of a rotatable machine during operation. However, it is contemplated that this disclosure has general application to inspecting components located in hostile environments of machinery during all phases of operation.

While the methods and systems are herein described in the context of a gas turbine engine and a steam turbine used in an industrial environment, it is contemplated that the method and apparatus described herein may find utility in other rotating machinery such as motors, blowers, water and air turbines and other combustion turbine systems applications including, but not limited to, turbines installed in aircraft. In addition, the principles and teachings set forth herein are applicable to gas turbine engines using a variety of combustible fuels such as, but not limited to, natural gas, gasoline, kerosene, diesel fuel, and jet fuel. The description hereinbelow is therefore set forth only by way of illustration, rather than limitation.

As used herein, normal machine operation refers to operations wherein the machine is performing its intended function for example, producing rotational power to drive a load, or receiving rotational power from a prime mover to perform work such as in the case of a generator. Other operations that are not deemed to be normal machine operation are operations on turning gear, coastdown from a trip or shutdown, or operations during upset conditions.

Figure 1:
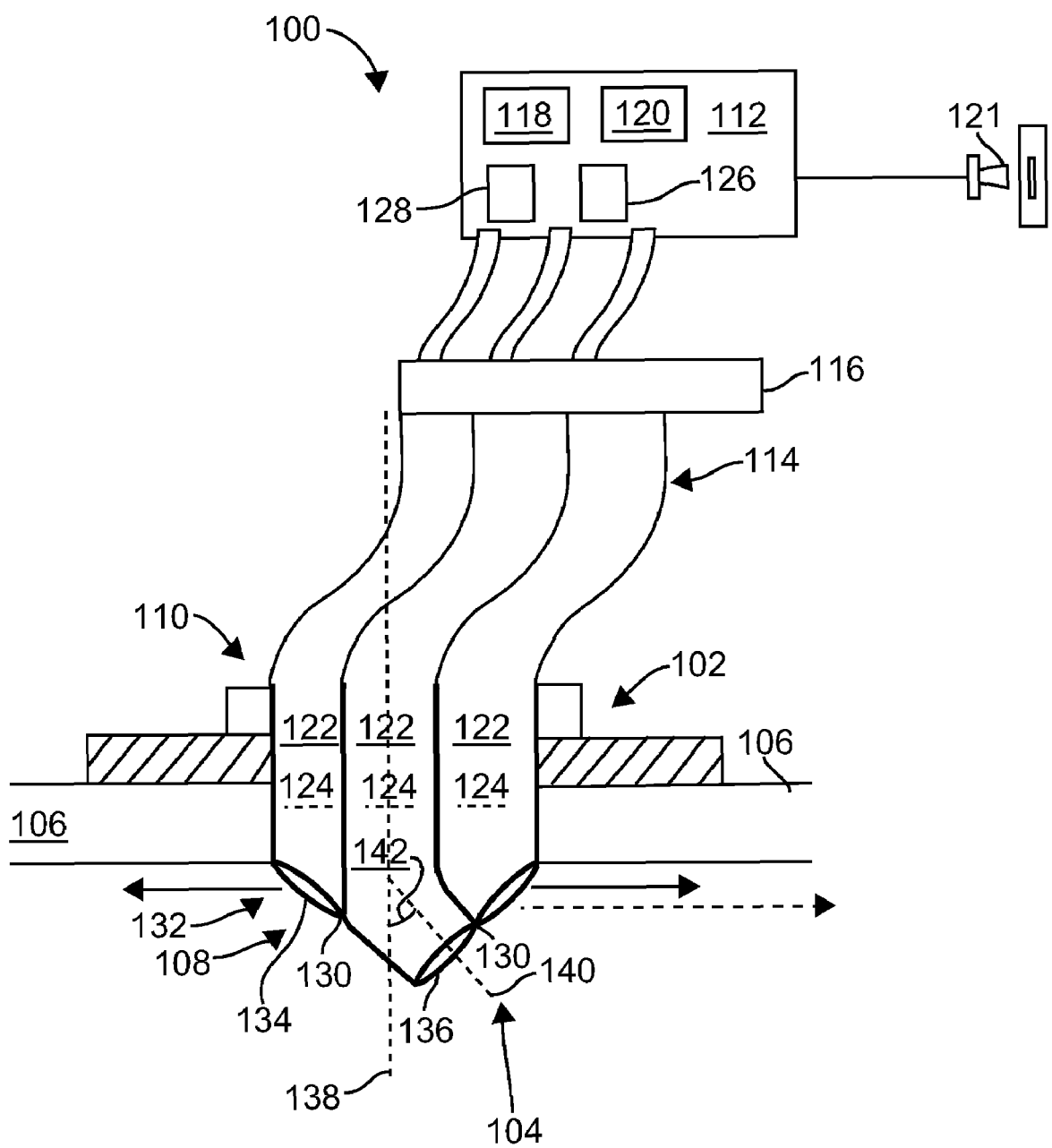
FIG. 1 is a side view of an exemplary inspection system in accordance with an embodiment of the present invention.

FIG. 1 is a side view of an exemplary inspection system 100 in accordance with an embodiment of the present invention. In the exemplary embodiment, system 100 includes a fiber optic port 102 configured to extend through a first aperture 104 of a machine casing 106. Fiber optic port 102 includes an interior end 108 exposed to the interior of machine casing 106 and an exterior end 110 configured to couple to an imager 112. Imager 112 configured to optically couple to exterior end 110 through a fiber optic cable 114. In one embodiment, an adapter head 116 is used to facilitate coupling. Imager 112 includes a light intensifier section 118 capable of amplifying low light conditions to generate images of for example, inspection components (not shown) though port 102. In the exemplary embodiment, imager 102 is capable of amplifying incident light several millions of times such that only ambient light available within machine casing 106 is used to generate images of the inspection components. The image capture is controlled by a gating acquisition section 120 such that high speed images of rotating or otherwise moving components may be captured frozen with minimal blurring. Gating may be synchronized to the angular position of the shaft of the machine using for example, a key phasor 121. Key phasor 121 detects the position of a feature of the shaft, for example, but not limited to a key, a key slot, a flat spot, a reflective area, or other feature that does not move during rotation of that shaft. With an input from a known position on the shaft system 100 can gate the image acquisition time and duration such that a succession of images of one rotating component can be captured and analyzed or displayed. Additionally, system 100 may use the input from key phasor 121 to synchronize pulsing light source 128 to facilitate reducing blur in the captured images, In various other embodiments, ambient light from outside machine casing 106 is introduced into the interior of machine casing 106 using a light only port (not shown in FIG. 1). In still other embodiments, light is introduced into machine casing 106 via a light path 122 in cable 114. The light may be any wavelength typically between ultraviolet (UV) and infrared (IR) wavelengths and may be constantly illuminating or may be gated to coincide with the gating of the image capture.

In the exemplary embodiment, port 102 includes a substantially cylindrical optical path 124 that is concentric with light path 122. In various alternative embodiments, light path 122 and optical path 124 are oriented side-by-side or a plurality of separate light paths 122 are oriented side-by-side with one or more optical paths 124. Additionally, the plurality of light paths 122 may be oriented circumscribing one or more optical paths 124.

Optical path 124 is configured to couple to a light sensor 126 of imager 112 such as a charged couple device (CCD) or a photocathode. Light path 122 is configured to couple to a light source 128. In the exemplary embodiment, optical path 124 and light path 122 are optically isolated from each other between imager 112 and interior end 108 using for example, a foil light barrier 130.

An interior end 132 of light path 122 may include a lens portion 134 that is configured to focus or diffuse light 136 emanating from interior end 132 to a predetermined degree. Similarly, optical path 124 may include a lens portion 136 to focus light incident on lens portion 136 to maintain a clear image of the intended inspection components. Lens portions 134 and 136 may be formed in a substantially planar cross-section or a curved cross-section.

Port 104 includes a central axis 138 and lens portion 136 includes a lens axis 140. In the exemplary embodiment, lens axis 140 is canted with respect to central axis 138 through an angle 142. In various other embodiments, angle 142 may vary such that lens portion 136 may be aimed toward inspection components at different locations. In the exemplary embodiment, port 104 is configured to rotate about central axis 138 such that inspection components at different locations may be brought into view by rotating port 104.

Figure 2:
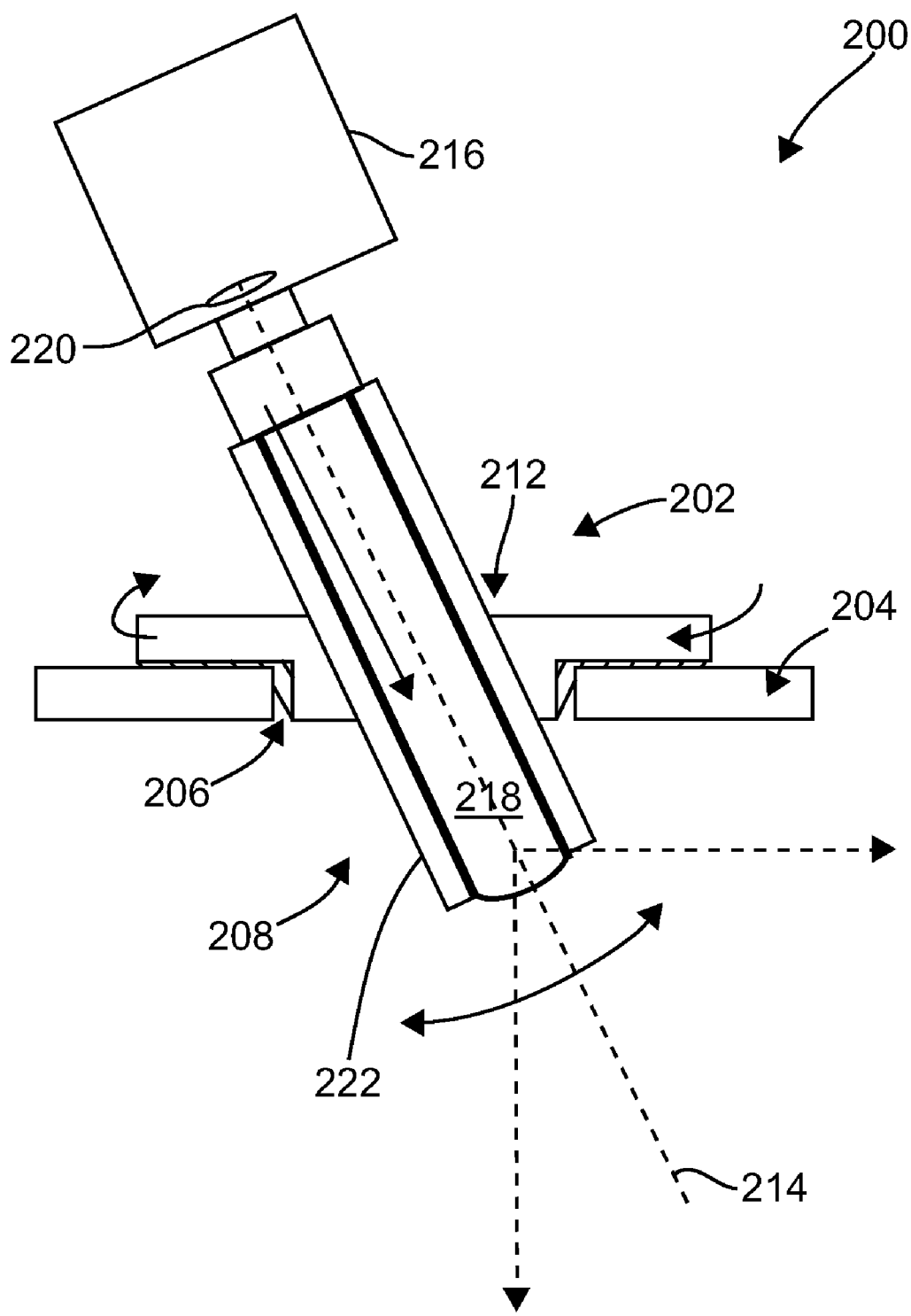
FIG. 2 is a side view of an inspection system in accordance with another exemplary embodiment of the present invention.

FIG. 2 is a side view of an inspection system 200 in accordance with another exemplary embodiment of the present invention. In the exemplary embodiment, system 200 includes an optical port 202 couplable to a machine casing 204 using a threaded gland nut 206 extending through an aperture 208 in casing 204. A light pipe or light tube 210 is coupled to gland nut 206 through a ball joint 212. Ball joint 212 permits light tube 210 freedom of movement to tilt in two dimensions and permits light tube 210 to rotate about a central axis 214. Such degrees of motion permits system 200 to view a wide area of the interior of casing 204.

In the exemplary embodiment, an imager 216 such as a high speed gated image intensifier CCD camera is coupled directly to light tube 210 and moves with light tube 210 through the various degrees of motion of light tube 210. Light tube 210 includes at least an optical path 218 that optically couples the interior of casing 204 to a sensor 220 associated with imager 216. Light tube 210 also includes at least one light path 222 configured to channel light from outside casing 204 to the interior of casing 204. The light may be ambient light or may be light generated by a light source and directed into light path 222.

Figure 3:
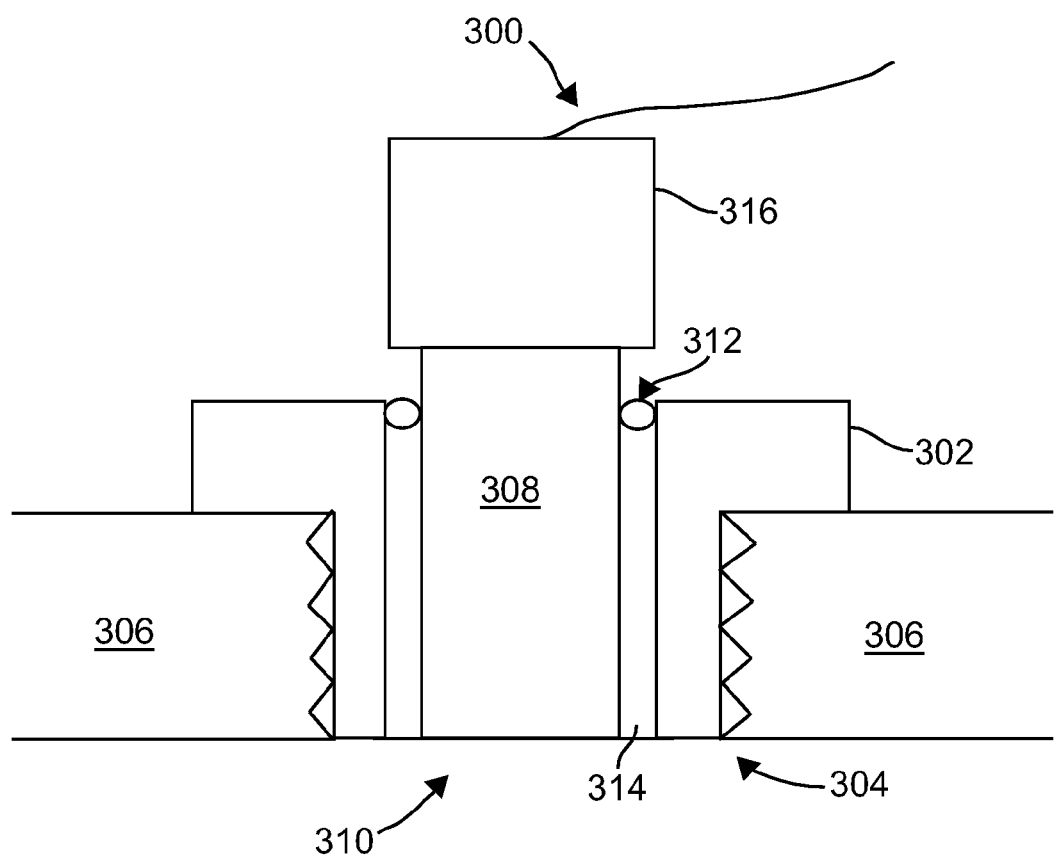
FIG. 3 is a side view of a light only optical port that may be used with the inspection systems shown in FIGS. 1 and 2, respectively.

FIG. 3 is a side view of a light only optical port 300 that may be used with inspection systems 100 and 200 (shown in FIGS. 1 and 2, respectively). In the exemplary embodiment, light only optical port 300 includes a gland nut 302 configured to threadably couple port 300 to an aperture 304 in a machine casing 306. A light tube 308 is slidably coupled through a bore 310 in gland nut 302. A seal 312 between light tube 308 and gland nut 302 substantially prevents passage of material or gas through a gap 314 between light tube 308 and gland nut 302. Seal 312 may comprise friction fit, interference fit, labyrinth, packing, weldment or other seals. Port 300 includes a light source 316 coupled to light tube 308 such that light generated by light source enters light tube 308 and is transmitted to the interior of casing 306 to illuminate the interior of casing 306. Light source 316 may generate light at any wavelength including but not limited to wavelengths between UV and IR. Additionally, light source 316 may be controlled by an inspection system (not shown in FIG. 3) to gate the light on or off and to control the intensity and/or frequency of the light. Alternatively, port 300 may be operated with light tube 308 open to ambient light outside casing 306, permitting ambient light to be channeled through light tube 308.

Figure 4:
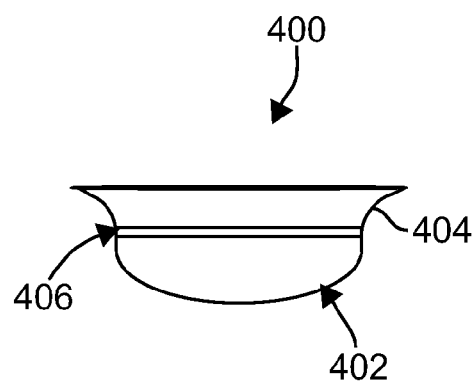
FIG. 4 is a side view of an exemplary optical path tip in accordance with an embodiment of the present invention.

FIG. 4 is a side view of an exemplary optical path tip 400 in accordance with an embodiment of the present invention. In the exemplary embodiment, optical path tip 400 includes a high temperature lens 402 coupled to a borescope port 404 using a pressure seal 406.

As will be appreciated by one skilled in the art and based on the foregoing specification, the above-described embodiments of the disclosure may be implemented using computer programming or engineering techniques including computer software, firmware, hardware or any combination or subset thereof, wherein the technical effect is in-situ imaging of online rotating machinery components for monitoring and observation in low light conditions using a gated image intensification device. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described methods and apparatus provide a cost-effective and reliable in-situ imaging device for online rotating machinery component monitoring and observation in low light conditions using gated image intensification. As a result, the methods and apparatus described herein facilitate gas turbine engine operation, maintenance, and repair in a cost-effective and reliable manner.

Exemplary methods and systems for in-situ imaging of online rotating machinery components for monitoring and observation in low light conditions using a gated image intensification device are described above in detail. The systems illustrated are not limited to the specific embodiments described herein, but rather, components of each may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. An inspection system comprising:
   a fiber optic port configured to extend through a first aperture of a machine casing, said port comprising an interior end and an exterior end; and
   an imager configured to optically couple to said exterior end, said imager comprising a light intensifier capable of generating images of inspection components through said port using ambient light, said imager further comprising an image capture gate configured to generate images of the inspection components during operations by controlling an acquisition time of the generated images.

2. A system in accordance with claim 1 wherein said port comprises a first optical path configured to couple to a light sensor of said imager and a second optical path configured to couple to a light source wherein said paths are optically isolated from each other within said port.

3. A system in accordance with claim 2 wherein an interior end of said second optical path comprises a lens portion, said lens portion formed in at least one of a substantially planar cross-section and a curved cross-section.

4. A system in accordance with claim 1 wherein said port comprises a first optical path configured to couple to a light sensor of said imager, an interior end of said first optical path comprises a lens portion, said lens portion formed in at least one of a substantially planar cross-section and a curved cross-section.

5. A system in accordance with claim 4 wherein a central axis of said lens portion is oriented obliquely with respect to a longitudinal axis of said first optical path.

6. A system in accordance with claim 1 wherein said port comprises a longitudinal axis substantially perpendicular to an opening of the aperture.

7. A system in accordance with claim 6 wherein said port is rotatable about the longitudinal axis.

8. A system in accordance with claim 1 wherein said port comprises a ball joint wherein said first optical path is swivelably coupled to the machine casing through the ball joint, said first optical path is tiltable with respect to the machine casing.

9. A system in accordance with claim 1 further comprising a light port configured to couple to a second aperture through the machine casing, said light port comprising a fiber optic member configured to at least one of permit ambient light to enter the machine casing and direct light from a light source into the machine casing.

* * * * *